(12) United States Patent
Bennett et al.

(10) Patent No.: US 8,230,323 B2
(45) Date of Patent: Jul. 24, 2012

(54) CONTENT DISTRIBUTION SYSTEM AND METHOD

(75) Inventors: Scott William Bennett, Oakton, VA (US); Chinatsu Aone, Oakton, VA (US); Mila Ramos-Santacruz, Leesburg, VA (US)

(73) Assignee: SRA International, Inc., Fairfax, VA (US)

( * ) Notice: Subject to any disclaimer, the term of this patent is extended or adjusted under 35 U.S.C. 154(b) by 1865 days.

(21) Appl. No.: 09/839,176

(22) Filed: Apr. 23, 2001

(65) Prior Publication Data
US 2002/0194379 A1  Dec. 19, 2002

Related U.S. Application Data

(60) Provisional application No. 60/251,421, filed on Dec. 6, 2000.

(51) Int. Cl.
*G06F 17/21* (2006.01)
(52) U.S. Cl. ........................................ 715/226
(58) Field of Classification Search .................. 709/226; 701/1; 715/226
See application file for complete search history.

(56) References Cited

U.S. PATENT DOCUMENTS

| | | | | |
|---|---|---|---|---|
| 5,664,063 A | * | 9/1997 | Johnson et al. | 358/1.1 |
| 5,864,848 A | * | 1/1999 | Horvitz et al. | 1/1 |
| 5,867,164 A | | 2/1999 | Bornstein et al. | |
| 5,923,848 A | * | 7/1999 | Goodhand et al. | 709/219 |
| 6,006,215 A | * | 12/1999 | Retallick | 1/1 |
| 6,026,388 A | * | 2/2000 | Liddy et al. | 1/1 |
| 6,026,410 A | * | 2/2000 | Allen et al. | 1/1 |
| 6,052,693 A | * | 4/2000 | Smith et al. | 1/1 |
| 6,185,527 B1 | * | 2/2001 | Petkovic et al. | 704/231 |
| 6,249,765 B1 | * | 6/2001 | Adler et al. | 704/500 |
| 6,263,335 B1 | * | 7/2001 | Paik et al. | 1/1 |
| 6,336,125 B2 | * | 1/2002 | Noda et al. | 715/246 |
| 6,343,291 B1 | * | 1/2002 | Goldman | 1/1 |
| 6,370,259 B1 | * | 4/2002 | Hobson et al. | 382/101 |
| 6,446,061 B1 | * | 9/2002 | Doerre et al. | 707/738 |
| 6,470,333 B1 | * | 10/2002 | Baclawski | 1/1 |
| 6,523,025 B1 | * | 2/2003 | Hashimoto et al. | 1/1 |

(Continued)

FOREIGN PATENT DOCUMENTS
EP  1014286 A2 *  6/2000

OTHER PUBLICATIONS

Applied Natural Language Processing Apr. 29-May 4, 2000. Presented to show date of the conference.*

(Continued)

*Primary Examiner* — Laurie Ries
*Assistant Examiner* — Frank D Mills
(74) *Attorney, Agent, or Firm* — Holland & Knight LLP; John P. Moran, Esq.

(57) ABSTRACT

A system and method is provided for automatically identifying information in unstructured text and extracting data representing certain types of information from the text to produce a structured set of templates with the extracted data. The newly structured data is then delivered to different types of user devices in accordance stored criteria associated with each type of device.

4 Claims, 5 Drawing Sheets

U.S. PATENT DOCUMENTS

| | | | |
|---|---|---|---|
| 6,523,029 B1* | 2/2003 | Kulyukin | 707/707 |
| 6,587,895 B1* | 7/2003 | Golovchinsky et al. | 710/12 |
| 6,604,079 B1* | 8/2003 | Ruvolo et al. | 705/9 |
| 6,675,356 B1* | 1/2004 | Adler et al. | 715/200 |
| 6,732,102 B1* | 5/2004 | Khandekar | 1/1 |
| 6,769,120 B1* | 7/2004 | Rodriguez | 718/100 |
| 6,957,205 B1* | 10/2005 | Liongosari et al. | 706/45 |
| 7,013,308 B1* | 3/2006 | Tunstall-Pedoe | 707/709 |
| 2002/0010700 A1* | 1/2002 | Wotring et al. | 707/100 |
| 2002/0052928 A1* | 5/2002 | Stern et al. | 709/218 |
| 2002/0059425 A1* | 5/2002 | Belfiore et al. | 709/226 |
| 2002/0091688 A1* | 7/2002 | Decary et al. | 707/6 |
| 2002/0116541 A1* | 8/2002 | Parker et al. | 709/318 |
| 2003/0196167 A1* | 10/2003 | Dewar | 715/507 |
| 2003/0233296 A1* | 12/2003 | Wagner | 705/31 |

OTHER PUBLICATIONS

Aone, et al., REES: A Large-Scale Relation and Event Extraction System, May 4, 2000, Proceedings of the 6th Applied Language Natural Processing Conference (ANLP-2000), Seattle, WA, pp. 1-9.*

Embley et al., Ontology-Based Extraction and Structuring of Information From Data-Rich Unstructured Documents (1998 ACM, CIKM '98 Bethseda MD, p. 52-59).*

Chinatsu Aone et al., "REES: A Large-Scale Relation and Event Extraction System," Proceedings of the Sixth Applied Natural Language Processing Conference (ANLP-2000).

Chinatsu Aone et al., "A Trainable Summarizer with Knowledge Acquired from Robust NLP Techniques," Advances in Automated Text Summarization, MIT Press, Cambridge, MA (1999).

* cited by examiner

CONTENT DISTRIBUTION SYSTEM AND METHOD

RELATED APPLICATIONS

This application is related to U.S. Provisional Patent Application No. 60/251,421, filed on Dec. 6, 2000, entitled "Large Scale Relation and Event Extraction System," which is incorporate by reference in its entirety into this application.

DETAILED DESCRIPTION

1. Field of the Invention

The present invention relates to methods and systems for distributing content in a network. More particularly, the present invention relates to methods and systems for automatically identifying and extracting information from source material, such as structured and unstructured documents, distributed in a network thereby permitting integration of specific extracted information with different applications.

2. Background of the Invention

The advent of the personal computer and modern telecommunications has resulted in millions of computer users communicating with each other around the globe. One of the primary uses of computers today is to send and receive electronic mail (email). Using an email software application, such as GROUPWISE form Novell Corp., LOTUS NOTES from Lotus Development Corp., or OUTLOOK from Microsoft Corp., users send and receive email in private and public networks.

In a typical configuration, an email server application (computer program) running on a server computer handles the delivery of all email within a private network of one or more computers. All email originating outside the private network and addressed to users within the private network is directed through the email server application for the private network.

To access email, users connect to the email server application using email client applications running on, for example, personal computer (PCs), personal digital assistants (PDAs), or other client devices connected to the network. The email client application retrieves email for the users and typically divides a user's mailbox into two parts, an in-box for incoming mail and an out-box for outgoing mail.

For pleasure, computer users use email to communicate with friends and family about nearly anything. However, in business they utilize email to distribute information related to business, including company activities or performance, competitor activities or performance, and information that may be time critical to the business such as information on meetings to be held or tasks to be performed.

With all the sources and types of email that users receive it has become extremely difficult for them to sort them and assign each to an appropriate category of relevance. When applicable, users may also use information included in or attached to email messages in other software applications such as applications that manage users' calendars, tasks, and address books. There is, however, no easy and quick way for users to integrate information from email messages with these other applications. Today, information of interest in email messages must be either cut-and-pasted or re-typed in other applications. Both of these methods introduce unnecessary inefficiencies.

Email is not the only source of information users may wish to assign relevance or integrate with other software applications. The Internet also hosts the "World Wide Web," or more simply, "the web." The architecture of the web follows a conventional client-server model. The terms "client" and "server" are used to refer to a computer's general role as a requester of data (the client) or provider of data (the server). Under the web environment, web browsers reside in clients and specially formatted "web documents" (also known as "web pages") reside on web servers. Web clients and web servers communicate using a protocol called "HyperText Transfer Protocol" (HTTP).

In operation, a browser opens a connection to a server and initiates a request for a document. The server delivers the requested document, typically in the form coded in a standard "HyperText Markup Language" (HTML) format. After the document is delivered, the connection is closed. The browser displays the document or performs a function designated by the document. These documents may contain information that users may wish to use in connection with other software applications such as organizers, calendars, task managers, and address books. But to do so using conventional methods requires cutting and pasting or re-typing material from web pages for use in connection with the other software applications.

In view of the foregoing, there is a need to provide a users with the ability to easily sort and categorize information in email messages, web pages, and the like, and to integrate (either automatically or on demand) selected information with other applications.

SUMMARY OF THE INVENTION

In accordance with the present invention, as embodied and broadly described herein, a method, system, and article of manufacture for communicating information is provided. In a system comprised of a network having a server communicably connectable to a plurality of devices, the method involves the server obtaining content addressed to a particular device. At least one event reflected by the content is typed, a form containing data extracted from the content is generated, and a notification of the event is made available to the particular device.

The system and article of manufacture provide substantially the same functionality.

It is to be understood that both the foregoing general description and the following detailed description are exemplary and explanatory only and are not restrictive of the invention, as claimed. Further features and/or variations may be provided in addition to those set forth herein. For example, the present invention may be directed to various combinations and subcombinations of the disclosed features and/or combinations and subcombinations of several further features disclosed below in the detailed description.

Additional advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DETAILED DESCRIPTION

Overview

Figure 1:
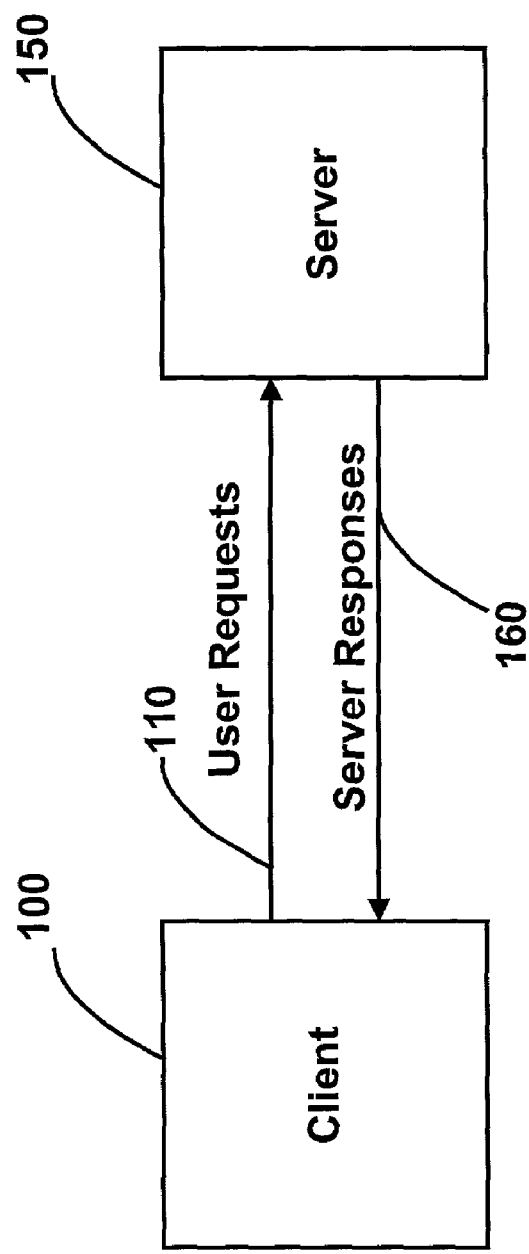
FIG. 1 shows a client/server system in which embodiments of the present invention may be implemented.

Systems and methods consistent with the present invention operate in networks in which users access data using a variety of different types of devices. Such systems and methods utilize processes that identify information in source documents, extract data representing the identified information, and produce a structured template with the extracted data. The extracted information may then be used in a variety of ways. It may be used to categorize or assign relevance to the source documents. Also, the user device may be programmed to automatically integrate all or part of the extracted information with other applications operating on the device. Alternatively, the user device may be programmed to alert the user concerning the extracted information for the user to determine further appropriate action(s). This alert can take the form of a prompt to integrate all or part of the extracted information with other applications operating on the device, or to invoke a separate process that may or may not use all or part of the extracted information.

Such systems and methods may be implemented using data networks alone or in combination with voice networks. A non-limiting list of data networks includes Intranets, Extranets, Virtual Private Networks, and the Internet. The voice networks may be private or public switch telephone networks.

Consistent with the present invention, the user devices at least receive data but they may also transmit and receive data. The users devices may be wireless or wired devices. A large variety of different types of users devices may be adapted for use in connection with systems and methods consistent with the present invention. A non-limiting list of user devices includes any type of computer, any type of personal digital assistant (PDA), and any type of device configured in accordance with standards used to configure computers, PDAs, and wireless (such as cellular and satellite) telephones for communicating data using the Internet. Those skilled in the art will be familiar with the various protocols, both adopted and proposed, including wired and wireless protocols used to configure computers, PDAs, and telephones to communicate using the Internet.

Systems and methods consistent with the present invention may operate on any form of source material, including structured text, unstructured text, or a combination of both. In this application the term "text" refers to any type of data used to convey information. Character-based languages, such as English, French, Chinese, and Japanese convey information using characters or combinations of characters. However, graphic images also convey information, and they may be structured or unstructured. For example, an icon on a display screen may include a combination of characters and graphics that convey to the viewer information on the application, file, or data represented by the icon. Consider, for example, an icon that illustrates a line graph with a line heading upward and includes the characters "IBM" and a value $2.00. In certain contexts this icon may convey to the viewer that the stock for International Business Machines Corp. has gone up in value by $2.00.

Structured text refers to text that complies strictly with a particular convention. Computer programs typically set conventions for types of data. These conventions create a structure for the data. For example, a computer program that requires a telephone number to consist of 10 digits might note a failure to comply with this convention when only seven digits is provided. A computer program that requires all articles for a newspaper to have a title, introductory paragraph, body, and conclusion paragraph, may note a failure to comply with this convention when an article missing the conclusion paragraph is processed.

Unstructured text refers to the text of any source that does not comply with a particular structure. For example, articles in newspapers and web pages from web sites are typical source material for unstructured text because they may be formatted by authors without regard to a particular convention, standard, or the like. All articles in newspapers do not necessarily share the same structure; similarly, all web pages do not necessarily share the same structure. Consequently, the reader cannot expect all articles or web pages to follow a particular format. The same would of course be true for any computer programs reviewing the same source material.

Email messages, for example, include both structured and unstructured text. An industry adopted standard requires all email messages to have a particular format. While this standard dictates an overall structure for all email messages, including particular fields such as a header and a body, it does not dictate a structure for the content within all fields. As such, content in certain fields may have to comply with a standard format but content in other fields does not. For example, content in the header field typically follows a specific format used to identify the sender and recipient of a message but the content in the body of the message has no specific format. Consequently, it is difficult to distinguish types of information reflected by email messages.

Systems and methods consistent with the present invention identify in any form of source material, types of information used to extract data from the source material. The types of information identified may be predetermined, such as event information, contact information, and task information. For example, event information identified in a source may be used to extract data to notify a user of an event, contact information may be used to extract data to update an address book, and task information may be used to extract data concerning a task to be performed.

However, systems and methods consistent with the present may be adapted to process other types of information, such as financial information, political information, and other types of information based on user interest. This interest may be reflected by the user directly instructing the system or it may be derived from other sources, such as the types of applications or information available on a user's device. For example, a user may specify interest in news information regarding a particular company or financial information concerning the company's stock price. Alternatively, the user may maintain financial portfolio information on his device from which his interest in news information on that company or financial information on the company's stock price may be derived. The extracted data is used to populate fields of templates, thus creating structured data sets from the unstructured information in sources. The process of extracting data and associating a piece of extracted data with a particular field of a template may use known data extraction techniques such as those disclosed by Aone, Chinatsu and Mila Ramos-Santacruz: "REES: A Large-scale Relation and Event Extraction System," in Proceedings of the 6th Applied Natural Language Processing Conference (ANLP-2000), Seattle, Wash., 2000. As explained in the aforementioned reference, the templates may be implemented using a data representation language, such as XML. Short for Extensible Markup Language, XML is a specification developed by the World Wide Web Consortium. XML is a pared-down version of SGML (Standard Generalized Markup Language), designed especially for web documents. It allows designers to create their own customized tags, enabling the definition, transmission, validation, and interpretation of data between applications and between organizations.

Systems and methods consistent with the present invention may utilize multiple types of templates, one for each type of information identified in a source. Consequently, such systems and methods may populate an event information template with data concerning an event extracted from a source, a contact information template with data concerning a contact (e.g., name, address, telephone number, etc.) extracted from a source, and a task information template with data concerning a task extracted from a source, etc.

Templates are used to form a structure for the extracted data. Each template structures the extracted data so it can be used in a variety of ways. For example, the structured data can be used to assign a category and/or level of relevance to a source. Structured data may also be used to update information managed by different applications. After the information is extracted from an email, for example, the user may be prompted to instruct the user's device to cause a separate software application, such as an organizer, to update the user's calendar, address book, or task (to-do) list.

Information extracted from other types of content may be used in a manner similar to the way systems and methods consistent with the present invention operate on email messages. It is possible to communicate information among applications in this way because the processes consistent with the principles of the present invention structure the information extracted from the unstructured text.

Users may also receive notifications of time critical events represented in the unstructured text. For example, when a particular event occurs, as identified in and extracted from the unstructured text of a web page, the system would alert users as to the event. In one configuration, users may register interest in receiving alerts concerning specific events or events concerning specific entities, e.g., people, companies, etc.

Event information identified in and extracted from unstructured text may also be interpreted and represented visually in various forms, including icons or images. For example, if the unstructured text of a web page indicates that a stock price has gone up by $10/share, an icon representing the stock may also reflect the increase in price.

In one example, a service facility performing processes in accordance with the principles of the present invention receives a request to view email from a web-enabled cellular telephone. The facility obtains the user's email from, for example, a mail server associated with the user's email account. The facility parses the email for structure and content of the body using various filters. The parsed content is then presented to a rule-based system that invokes various processes to process the email. One such process automatically identifies information in unstructured text of the email message and extracts data representing, for example, an event to produce a structured template with the extracted data. The facility then delivers the structured data to the web-enabled cellular telephone for further action. In the case of an event, the facility may also prompt the user to update a calendar associated with the user's organizer to reflect the event. For example, if the event is a new meeting, the user's calendar is updated to include the meeting. If the event is a change to an existing meeting, the user's calendar would be updated accordingly. The user's organizer may be stored locally in the web-enabled cellular telephone. If the user's organizer is stored on another device or if the user maintains a copy of the organizer on another device in addition to the telephone, then the user may invoke a process to update the other device. This process synchronizes copies of the organizer.

Reference will now be made in detail to the present exemplary embodiments of the invention, examples of which are illustrated in the accompanying drawings. Wherever possible, the same reference numbers will be used throughout the drawings to refer to the same or like parts.

Exemplary System Architecture

Systems and methods consistent with the present invention utilize processes that identify information in source material, extract data representing the identified information, and produce a structured template with the extracted data. The extracted information may then be used in a variety of ways. Although the following will be described with reference to particular embodiments, including data structures, flow of steps, hardware configurations, etc., it will be apparent to one skilled in the art that implementations of the present invention can be practiced without these specific details.

Implementations of the present invention use a client/server architecture, as illustrated in FIG. 1, wherein a client 100 sends messages, called user requests 110, for services to a server 150. The server 150, as will be described in more detail below, performs operations based on these user requests 110, and provides information as messages, called server responses 160, to the client 100. The client 100 represents a process active in a data processing system, and the server 150 represents a process active in a second data processing system. Client 100 and server 150 communicate with one another over a communication medium, such as a network (for example, the Internet), thus providing distributed functionality and allowing multiple clients to take advantage of the server 150. Each process is typically implemented in software, and is executed by a central processing unit and related components present in conventional data processing devices.

Consistent with the present invention, many different types and configurations of devices may operate as clients 100 and servers 150. For example, personal computers, PDAs, and web-enabled cellular telephones may be clients 100, and workstations and mainframe computers may be servers. The particular type of device (client or server) does not matter. What matters is that the devices are configured to operate in a manner consistent with the principles of the present invention.

Figure 2:
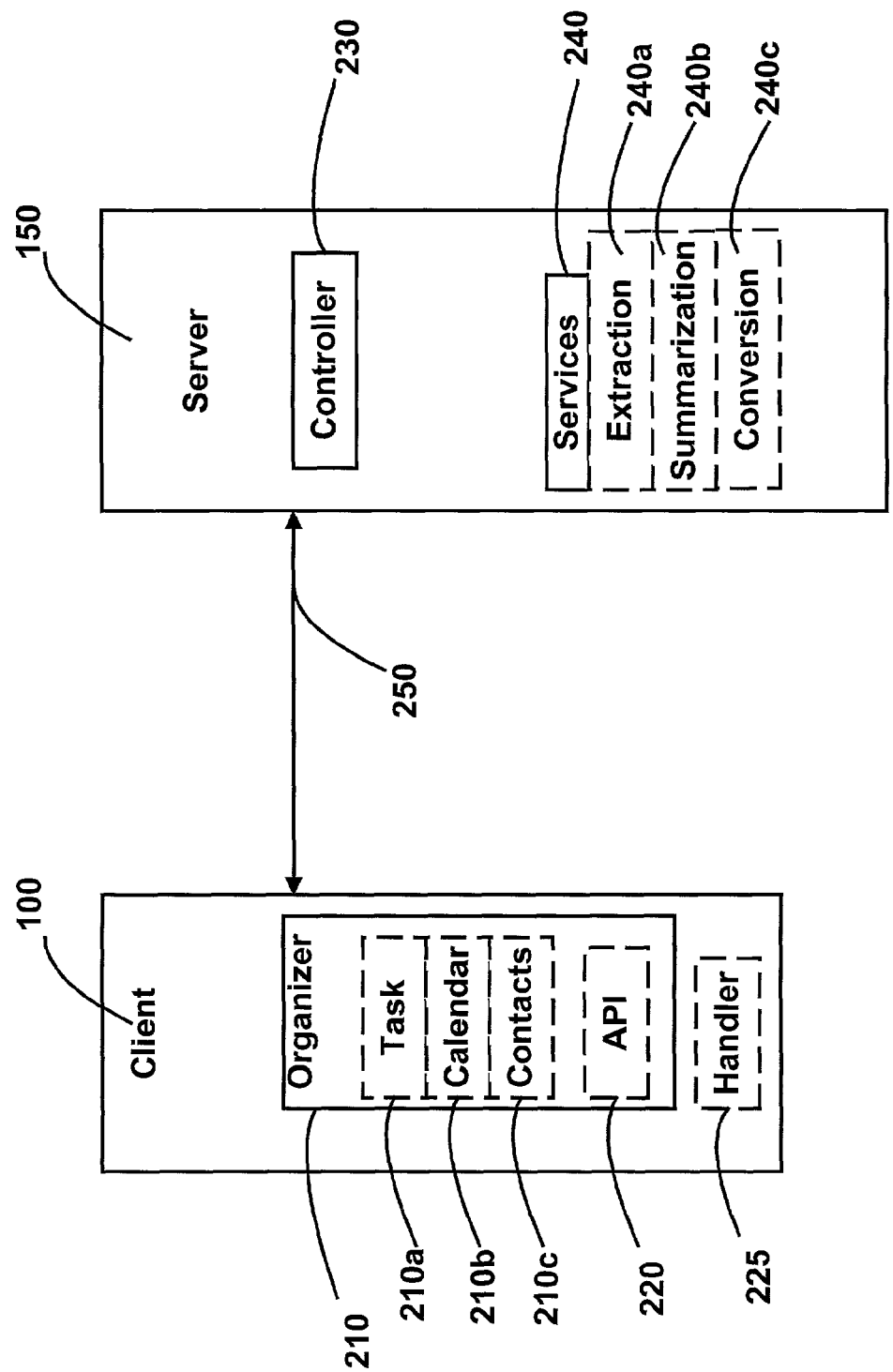
FIG. 2 shows a more detailed view of the client/server system illustrated in FIG. 1.

A more detailed view of an example of client 100 and an example of server 150 consistent with the principles of the present inventions are shown in FIG. 2. Client 100 and server 150 communicate messages 250 using one or more standard protocols such as the Hypertext Transfer Protocol (HTTP), Simple Mail Transfer Protocol (SMTP), and Internet Message Access Protocol (IMAP). HTTP is used for web communications, SMTP and IMAP are different protocols used for electronic messages. Client 100 and server 150 therefore include the necessary interface software (both output and input) required for processing messages formatted in accordance with implemented protocols. For simplicity these interfaces are not shown in FIG. 2.

The client 100 comprises an organizer 210 with task, calendar, and contact components, 210a, 210b, and 210c, respectively. Those skilled in the art will recognize that task component 210a of organizer 210 stores and manages information concerning tasks (e.g., "to do" items), the calendar component 210b stores and manages information concerning time-related events (e.g., meetings, conferences, deadlines, etc.), and contact component 210c stores and manages information concerning contacts (e.g., name, address, telephone number, fax number, etc.). Organizer 210 may be fully functional in the sense that it provides the services of an organizer program executable on a personal computer, such as LOTUS ORGANIZER from Lotus Development Corporation, GROUPWISE from Novell Corporation, or OUTLOOK from Microsoft Corporation. However, for client devices with limited resources (e.g., computing power, memory, etc.), such as palmtop devices, web-enabled telephones, and the like, organizer 210 may contain limited organizer functionality.

In an alternative configuration, client 100 may have the limited functionality of only one or two of components 210a, 210b, and 210c. Also, the components may not be integrated into a single application, like organizer 210. In this "unintegrated" configuration, component 210a would be separate from component 210b, and both components 210a and 210b would be separate from component 210c. Alternatively, components 210a and 210b may be part of a single organizer and component 210c may be separate from that organizer.

Thus, one skilled in the art will recognize that there are many different applicable organizations for the components of an organizer in client 100. Additionally, client 100 may have other executable applications, including for example any type of application executable on a PDA, personal computer, or other user device that can be used as a client in systems consistent with the present invention.

Regardless of the specific organization of components implemented in a particular configuration, consistent with the present invention the components or combination of components on client 100 have an application program interface, like API 220 for organizer 210. The API 220 defines an interface for communicating with organizer 210. It specifies the format and content of instructions used to invoke operations of component(s). Some applications do not have APIs, in which case it may be necessary to cause the application to execute a set of operations without the benefits of an API.

Client 100 may also have a component 225 configured to handle messages from server 150 specific to implementations consistent with the present invention. As discussed more fully below, server 150 sends special messages to client 100, including templates with data extracted from sources with unstructured text. Certain applications like organizer 210 may be configured to process these types of messages, or their APIs may be used for this purpose. Other applications, however, will rely on handler 225 for this service.

Server 150 comprises a controller 230 and one or more services 240, such as extraction service 240a, summarization service 240b, and conversion service 240c. Controller 230 manages all operations of server 150. Controller 230 determines which service(s) 240 are to be performed in connection with each new message, causes the service to be performed, and outputs any response. Controller 230 is formed of a rule-based system, which includes a set of rules for processing messages. Depending on the type of message particular rule(s) of controller's rule base are said "to fire" or execute.

Server 150 may also store in database (not shown) profile data associated with users. When users register for services of server 150, they may provide registration information, and at least a portion of the registration information may form user profile data. Registration information may include billing information (e.g., who, where, and how to charge for services), and service information (e.g., identification of user device(s) associated with a user, identification of user device(s) at which the user wishes to receive service output, types of services requested, etc.). Billing information may be used to invoice users for services. Profile data, on the other hand, may be used in connection with providing the services.

All new messages are queued by the controller 230 for processing. Controller 230 assigns a priority to each message in the queue so certain types of messages may have a higher priority than others. The priority may be predetermined based on type. For example, HTTP messages may have a higher priority than SMTP (email). Messages (both queued and new ones not yet on the queue) will be processed by controller 230 in order of their assigned priority. Priority for a message on the queue may change. For example, an SMTP message may have a lower priority than HTTP messages, which causes controller 230 to repeatedly favor HTTP messages for processing over the SMTP message but once the SMTP message has not been processed for a predetermined period of time controller 230 may dequeue it for processing ahead of a new or queued HTTP message. Those skilled in the art will appreciate that controller 230 may implement many different algorithms (or combinations of algorithms) to ensure quick and fair processing of all incoming messages. Controller 230 has rules that implement the particular algorithms selected by the designer.

Server 150 has three services 240, extraction 240a, summarization 240b, and conversion 240c, although the present invention is not so limited and additional services may implemented within the scope of the present invention. For example, the interfaces referred to above are services of server 150. Server 150 may also provide services that categorize sources, prioritize sources, iconize (make icons out of) sources (explained below), or generate various types of output such as audio, video, graphic, etc. In certain implementations, a user may indicate to server 150 to provide audible output messages instead of, or in addition to, display messages.

Server 150 uses these services when controller 230 processes messages. In accordance with the present invention, extraction service 240a generally determines the type of information reflected by text of a source (e.g., email message, web page, etc.) and generates a template containing data extracted from the unstructured text. Further according to the present invention, controller 230 sends the completed template, alone or with the source itself to a client. The controller 230 may, using the API of an application resident in the client, integrate data in the completed template with data already stored by the client. As suggested above, controller 230 may send a message to the client prompting a user associated with the client for an instruction as to whether to integrate the data in the completed template with data already stored by the client. A data handling component, like component 225 of client 100, may process this prompting message by causing client 100 to display the message on a display screen and enter a wait state for the user to select a key on an input device signaling the data handling component to invoke a process designated by the API for the appropriate client application.

Those skilled in the art will recognize that certain architectures consistent with the present invention may provide for clients that do not have resident applications but instead communicate with servers that manage applications and/or application data for the clients. For example, a client device may communicate with a server that maintains a calendar for a user associated with the client device. In such a configuration, the client device may be prompted to update the calendar located on the server.

Of course certain hand-held devices utilize a sync operation to synchronize data between a desk-top computer and a hand-held device. The prompt to update a calendar may be provided to the client hand-held device while the update itself is made to the computer associated with the hand held device. The hand held device may be updated using the synch operation.

Figure 3:
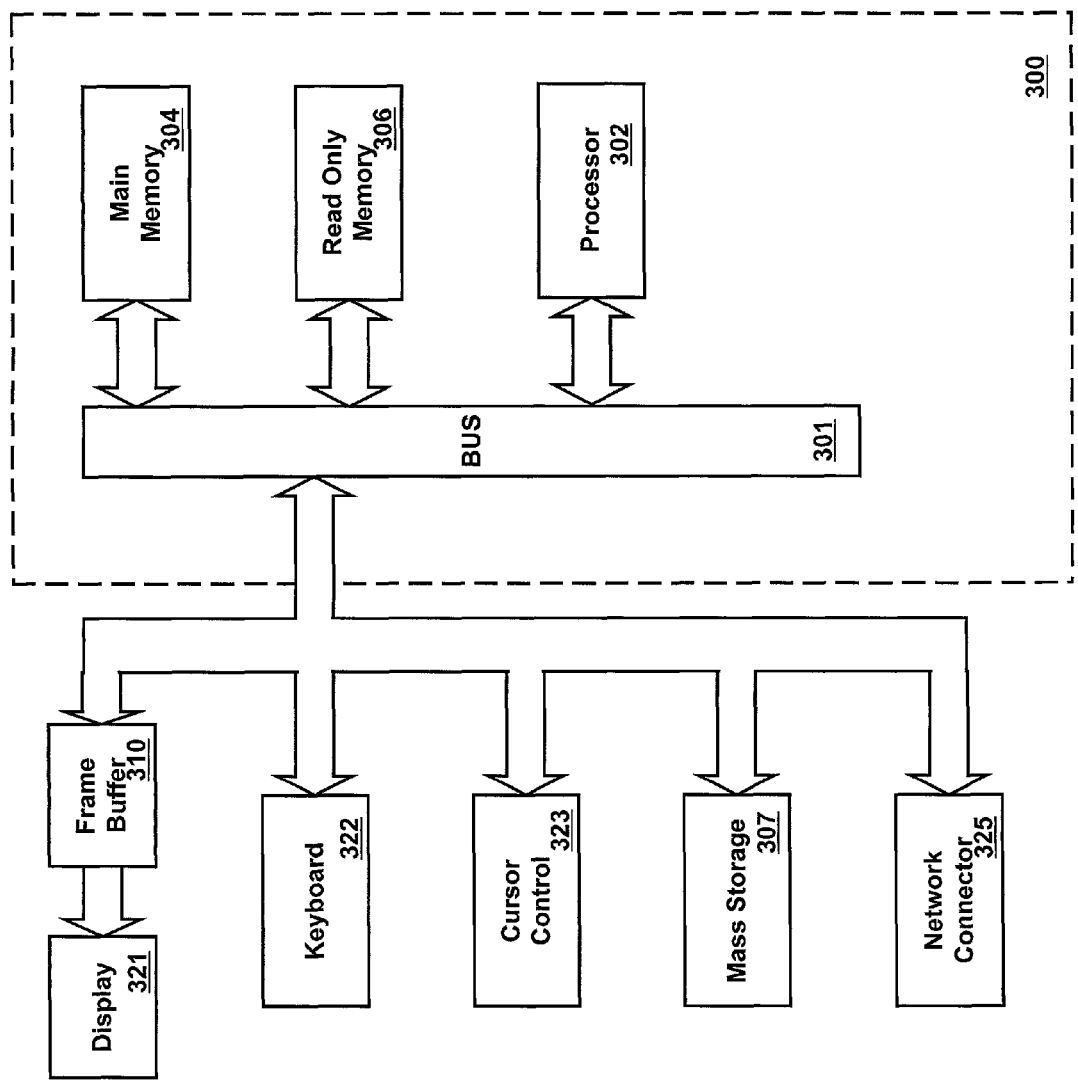
FIG. 3 shows that structure of a workstation in which a client process or a server process may be operative.

An example of a data processing system 300 in which the client 100 or server 150 may be operative is illustrated in FIG. 3. System 300 comprises a bus or other communication means 301 for communicating information (data, addresses, etc.) and a processor 302, coupled with bus 301, for processing information in accordance with instructions. System 300 further comprises a random access memory (RAM) or other volatile storage device 304 (referred to as main memory), coupled to bus 301, for storing information and instructions to be executed by processor 302. Main memory 304 also may be used for storing temporary variables or other intermediate information during execution of instructions by processor 302. System 300 also comprises a read only memory (ROM) and/or other static storage device 306 coupled to bus 301 for storing static information and instructions for processor 302.

System 300 may further be coupled to a display device 321, such as a cathode ray tube (CRT) or liquid crystal display (LCD), coupled to bus 301, for displaying information to a computer user. Such a display 321 may further be coupled to bus 301 via a frame buffer 310 so information in a single or multiple frames or images can be displayed on display device 321. An input device including keys, such as a keyboard 322, may also be coupled to bus 301 for communicating information and command selections to processor 302. An additional user input device is cursor control 323, such as a mouse, a trackball, stylus, or cursor direction keys, coupled to bus 301, for communicating direction information and command selections to processor 302, and for controlling cursor movement on display 321. A data storage device 307, such as a flash memory, or magnetic or optical disk and its corresponding drive, may also be communicably connectable to bus 301. And a network connector 325 enables communication with a network. Consistent with the present invention various types of network connectors 325 may be used with system 300, including modems, network cards, and the like.

Controller Processing

Figure 5:
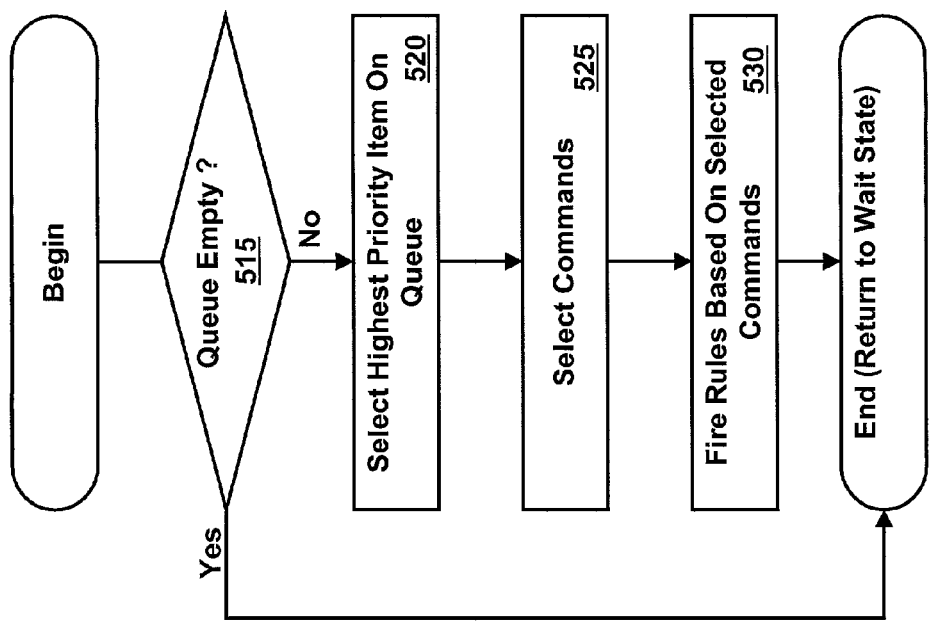
FIG. 5 is a flow chart of the process used by the controller of FIG. 2 to dequeue items in a manner consistent with the present invention.
Figure 4:
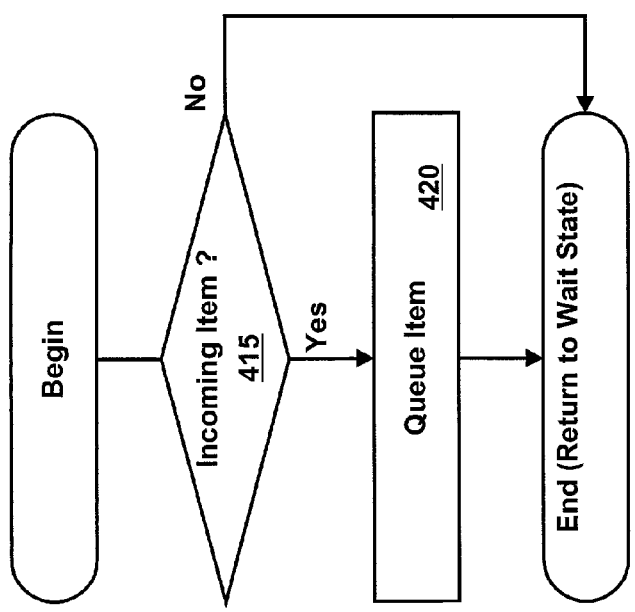
FIG. 4 is a flow chart of the process used by the controller of FIG. 2 to enqueue items in a manner consistent with the present invention.

Controller 230 manages all operations of server 150. The functions of controller 230 will now be explained in detail with reference to FIGS. 4 and 5. FIG. 4 is a flow chart of the queuing process used to queue incoming items to be processed by server 150, and FIG. 5 is a flow chart of the process involved in processing items on the queue. The process illustrated by these figures are asynchronous in the sense that they may be operating simultaneously on server 150. As explained above, server 150 processes requests. Requests may include, for example, requests to retrieve email messages or requests to retrieve web pages.

In response to a request, server 150 accesses an email server application to retrieve email or a web site to retrieve a web page for a user. Those skilled in the art will recognize that client devices may maintain a connection with server 150 to receive new email in the same way client email applications maintain a connection to their email server application to receive new email nearly immediately following their arrival. Server 150 may also push email to client devices as the server 150 processes the email for the client devices in accordance with the principles of the present invention.

The queuing process of controller 230 waits for incoming items to process. Incoming items include any source document such as an email message (with or without an attachment) or a web page. When an incoming item is received (step 415), it is queued for processing (step 420). Otherwise, the queuing process remains in the wait state (step 425).

FIG. 5 is a flow chart of the process used to dequeue items queued by the process of FIG. 4. As long as the queue is not empty (step 515), the queued item with the highest priority is dequeued (step 520). The dequeued item is then examined to identify any commands associated with the item that reflect a process for operating on or in connection with the item. For example, users may register for specific services of server 150 so when the process of FIG. 5 dequeues an item the selected service(s) of a registered user may be reflected in commands associated with the item. Commands may also be specified in or derived from text of an item. For example, the item may be an email message and it may contain an instruction to send a facsimile. This instruction is determined to be a command and server 150 may perform an operation consistent with the command. Once commands for an item have been selected (step 525), controller 230 fires all rules to process the item in accordance with the selected commands (step 530). Selected commands may be queued and processed in the same manner that items are queued and processed.

If no command has been specified and none can be derived from the item, controller 230 may select a default command, which may simply proceed to the next step 530 to fire appropriate rules of the rule-based engine. The result of a rule firing may cause another rule to fire and so on. The processing of rule-based systems in this manner is well known to those skilled in the art.

Certain rules may require controller 230 to refer to a user's profile. Server 150 may maintain profile information for system users. For example, a user's profile may specify services selected by the user (e.g., paid for by the user), and a rule may indicate the need to refer to the user's profile to determine the specific process to apply to a specific item. The rules fired for specific items may cause controller 230 to invoke processes to perform services 240. As explained, two such services are extraction 240a and summarization 240b. Those skilled in the art will recognize that controller 230 may be implemented using a non-rule-based architecture and perform the same operations as the rule-based configuration described herein.

Conversion Service

Figure 6:
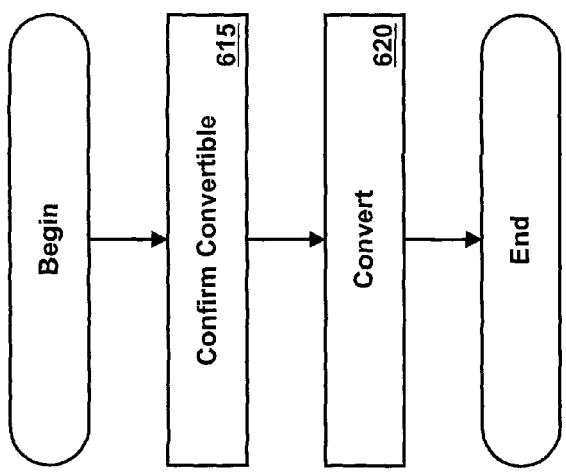
FIG. 6 is an exemplary flowchart of a conversion process, consistent with the principles of the present invention.

FIG. 6 is a flow chart of the steps performed by conversion service 240c in a manner consistent with the present invention. First, service 240c confirms the item is convertible in the sense that it is possible to convert it to a form for further processing by another service, e.g., one of the services 240a or 240b (step 615). Certain sources may not be convertible for this purpose. For example, in certain configurations, server 150 may not be able to process all types of graphic images. In such configurations, a determination is made as to whether the source graphic image is convertible to provide information for processing by other services. Not all types of text documents may be convertible either; so conversion service 240c determines whether a source text document is convertible. If the answer to this determination is no, then the conversion service 240c cannot service the source. Otherwise, the source item undergoes a conversion process (step 620). In one configuration consistent with the present invention, conversion service 240c may be performed by invoking operation of a commercial software application like OutsideIn from Inso Corp. or KeyView from Verity, Inc.

Extraction Service

Figure 7:
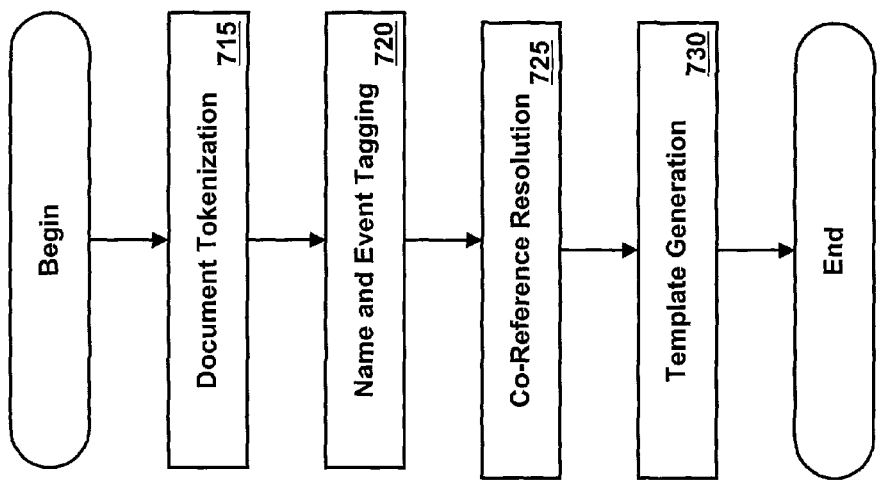
FIG. 7 is an exemplary flowchart of a extraction process, consistent with the principles of the present invention.

As explained, any suitable extraction service 240a may be used in accordance with the principles of the present invention. One such service is explained in Aone, Chinatsu and Mila Ramos-Santacruz: "REES: A Large-scale Relation and Event Extraction System," in Proceedings of the 6th Applied Natural Language Processing Conference (ANLP-2000), Seattle, Wash., 2000, which is incorporated herein by reference. Although the steps of an extraction process are described herein with reference to FIG. 7 in a particular order, they may be performed in other orders, as will be apparent to those skilled in the art.

First, the item being subjected to the extraction process is tokenized into a logical hierarchical tree structure representing parts of the document (step 715). For example, if the document contains multiple paragraphs, each paragraph would represent a node, and under each paragraph node there would be multiple nodes, one for each sentence of the paragraph, and under each sentence node there would be multiple nodes, one for each word in the sentence. Printed in Table A below is a physical representation of the logical hierarchical tree structure

TABLE A

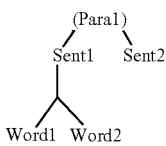

During this tokenization process, a token type of each word is also identified. For example, capitalized words are distinguished from lower case words, punctuation in the document is located, and integers are located, among others. This hierarchical tree structure of the document facilitates further processing in accordance with principles consistent with the present invention.

After tokenization is complete, the process applies a series of extraction pattern sets to recognize proper names and pre-specified events (step 720). The name pattern set would tag dynamically, for example, the names of people, places, organizations, email/surface addresses, URL's, telephone/fax numbers, monetary expressions, dates, time, etc. The event pattern set would tag, for example, scheduling events, tasking events, merger & acquisition events, and so on. The items to be extracted are extendable.

After the tagging process, a co-reference resolution process (step 725) links any anaphoric expression (e.g., a pronoun like "he," a definite noun phrase like "the company") to its referent in the document (e.g., "Mr. Smith," "XYZ Inc.") so that the extracted data contains more explicit and complete information.

Lastly, the process builds templates with information extracted from the document (step 730). The system stores a set of "fill rules" to fill fields of templates with corresponding information from the document identified during the previous processes. If, for example, the process is performing a scheduling event extraction on a source document, then the scheduling event templates are filled. In this way, the process can effectively extract meaningful information from the document.

Consider a source document having the following sentence: "The next meeting with Mr. John Collins will be on Jan. 8, 2001 in the ABC Conference Center." Consider also that an event template consists of six elements, including event type, attendees, date, location, description, and instruction. The process of FIG. 7 would identify the event type as SCHEDULING, the attendees as "Mr. John Collins," the date as "Jan. 8, 2001," and the location as "ABC Conference Center."

Summarization Service

Systems and methods consistent with the present invention may utilize any known summarization technique, including for example the techniques disclosed in U.S. Pat. No. 5,867,164 to Bornstein et al. for Interactive Document Summarization, and Aone, Chinatsu, Mary Ellen Okurowski, James Gorlinsky, and Bjornar Larsen: "A Trainable Summarizer with Knowledge Acquired from Robust NLP Techniques," in Mani and Mabury (eds.), Advances in Automated Text Summarization, MIT Press, Cambridge, Mass., 1999, both of which are incorporated herein by reference.

CONCLUSION

As explained above, systems and methods consistent with the present invention populate one or more fields of one or more templates with data extracted from a source and examine the templates to determine the types of information represented by the source. In one example, the event extraction process automatically identifies and extracts meeting events from email and other textual data. Extracted information is represented in XML. A calendar update program takes this information, suggests calendar updates to users of calendar software, and allows them to confirm or reject the suggestion.

In another example, the event extraction process automatically identifies and extracts new phone/fax/cell phone numbers, email addresses, etc. from email and other textual data. Extracted information is represented in XML. An address book update program takes this information, suggests address book updates to users of address book software, and allows them to confirm or reject the as suggestion.

In yet another example, the event extraction process automatically identifies a message as requiring action and identifies those sentences or phrases that detail the action to be taken and/or any deadlines associated with taking the action. Extracted information is represented in XML. A to-do list update program takes this information, suggests to-do updates to the users of the to-do list software, and allows them to confirm or reject the suggestion.

In still another example, the event extraction process automatically identifies and extracts time-critical events from textual materials such as research reports, news release, newspaper articles, etc. The system outputs different types of XML summaries: 1) structured templates, 2) English sentences generated from the information in the templates, or 3) a set of sentence extracts in which the extracted information is found. The user can set preferences for what types of information they like to receive, and is alerted with the summaries via wireless devices.

In another example, the extraction process extracts event data from a source and uses an XML template to present a visualization of the event consisting of an icon for the event along with key components of the event. Additionally, the icon can be used to link to additional data that puts the event in context. The icon may be generate by the server and sent electronically to the client. Alternatively, the client may have a library of icons and the server may send a signal to the client to retrieve a stored icon. In yet another configuration, the client may retrieve a stored icon in response to a signal from the server and modify the retrieved icon in accordance with additional commands from the server.

Systems consistent with the present invention may determine an incoming message to be a high-priority (automatically or by a manual setting), and initiate a voice alert to the user (either through a telephone call or through speaking the alert to them through a computer workstation or other device). In this way, the systems engage an interactive dialog with the user who may then hear different descriptions of the incoming message including variable length summaries (as described above), mentioned individuals, mentioned events, etc. A call or message can be initiated by the user in response to the alert.

Those skilled in the art will recognize that if a source is received along with an indication of its type, for example, a task item, the process of extracting type-specific data from the source may be simplified significantly. Knowing the type of data represented in the source, the process involves completing fields of a set of templates for information of the specific, known type without having to deal with templates for other types of information. Thus, in one alternative configuration, each source may be reviewed or pre-processed, either automatically or manually, to determine its type, or the provider of each source may designate a source's type.

This also avoids conflict problems that may arise where the process may indicate that a particular source reflects more than one type of information; such conflicts may require a resolution process as part of extraction processing. The resolution process may simply favor certain types over others or it may measure levels of information extracted from a source and resolve a conflict based on the measurements. For example, tasks may have a higher priority than appointments (events for a calendar) or the process selects the calendar type over task type because more of the template(s) representing an appointment is completed as compared to the template(s) representing a task.

Of course the same template may also be used for both appointments and tasks, with the system discriminating between the two based on the fields completed in a particular instance.

Other features and modifications may be provided with the invention. For example, although this description discusses text messages written in the English language, those skilled in the art will recognize that the principles of the present invention described herein may be used with text messages written in other languages.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems.

Furthermore, although aspects of the present invention are described as being stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above described embodiments, but instead is defined by the appended claims in light of their full scope of equivalents.

What is claimed is:

1. In a system comprised of a network having a server communicably connectable to a plurality of devices, a method for communicating information comprising:
    receiving at the server content addressed to a particular device;
    typing at least one event reflected by the content, including
        tokenizing the content into a logical hierarchical tree representing parts of the content;
        applying to the logical hierarchical tree extraction pattern sets to recognize and tag proper names and pre-specified events in the content;
        linking any anaphoric expression to its referent, in the content;
        filling fields of templates with corresponding information from the content based on a result of the application of the pattern sets to the logical hierarchical tree, reflecting the linking of any anaphoric expression to its referent, in the content;
    generating a form containing data extracted from the content; and
    making available to the particular device a notification of the event.

2. The method of claim 1, wherein typing at least one event reflected by the content, comprises: extracting data from the content, the extracted data including a set of data elements; filling fields of a set of templates with the data elements by matching fields to the data elements according to a determined type for each data element; and identifying the event based on the filled fields of the templates.

3. A system for communicating information comprising:
    a processor; and a memory storing instructions executable by the processor to receive content addressed to a particular device, perform an extraction process to generate a message in a data representation language containing data reflecting an event extracted from the content, and make the message available to the particular device
    wherein when the processor executes the instruction to perform an extraction process to generate a message in a data representation language containing data reflecting an event extracted from the content, the processor (a) tokenizes the content into a logical hierarchical tree representing parts of the content; (b) applies to the logical hierarchical tree extraction pattern sets to recognize and tag proper names and pre-specified events in the content; (c) links any anaphoric expression to its referent, in the content; and (d) fills fields of templates with corresponding information from the content based on a result of the application of the pattern sets to the logical hierarchical tree, reflecting the linking of any anaphoric expression to its referent, in the content.

4. A computer program product in a computer readable storage media, the computer program product being capable of configuring a data processor to communicate information in a network having a plurality of devices, and comprising:
    non-transitory program code to cause the data processor to perform the steps of:
        receiving content addressed to a particular device;
        typing at least one event reflected by the content, including
            tokenizing the content into a logical hierarchical tree representing parts of the content;
            applying to the logical hierarchical tree extraction pattern sets to recognize and tag proper names and pre-specified events in the content;

linking any anaphoric expression to its referent, in the content; and filling fields of templates with corresponding information from the content based on a result of the application of the pattern sets to the logical hierarchical tree, reflecting the linking of any anaphoric expression to its referent, in the content;

generating a form containing data extracted from the content; and making available to the particular device a notification of the event.

* * * * *